Sept. 30, 1941.   R. ANSCHÜTZ ET AL   2,257,409
TYPEWRITING-CALCULATING MACHINE
Filed July 14, 1938   10 Sheets—Sheet 8

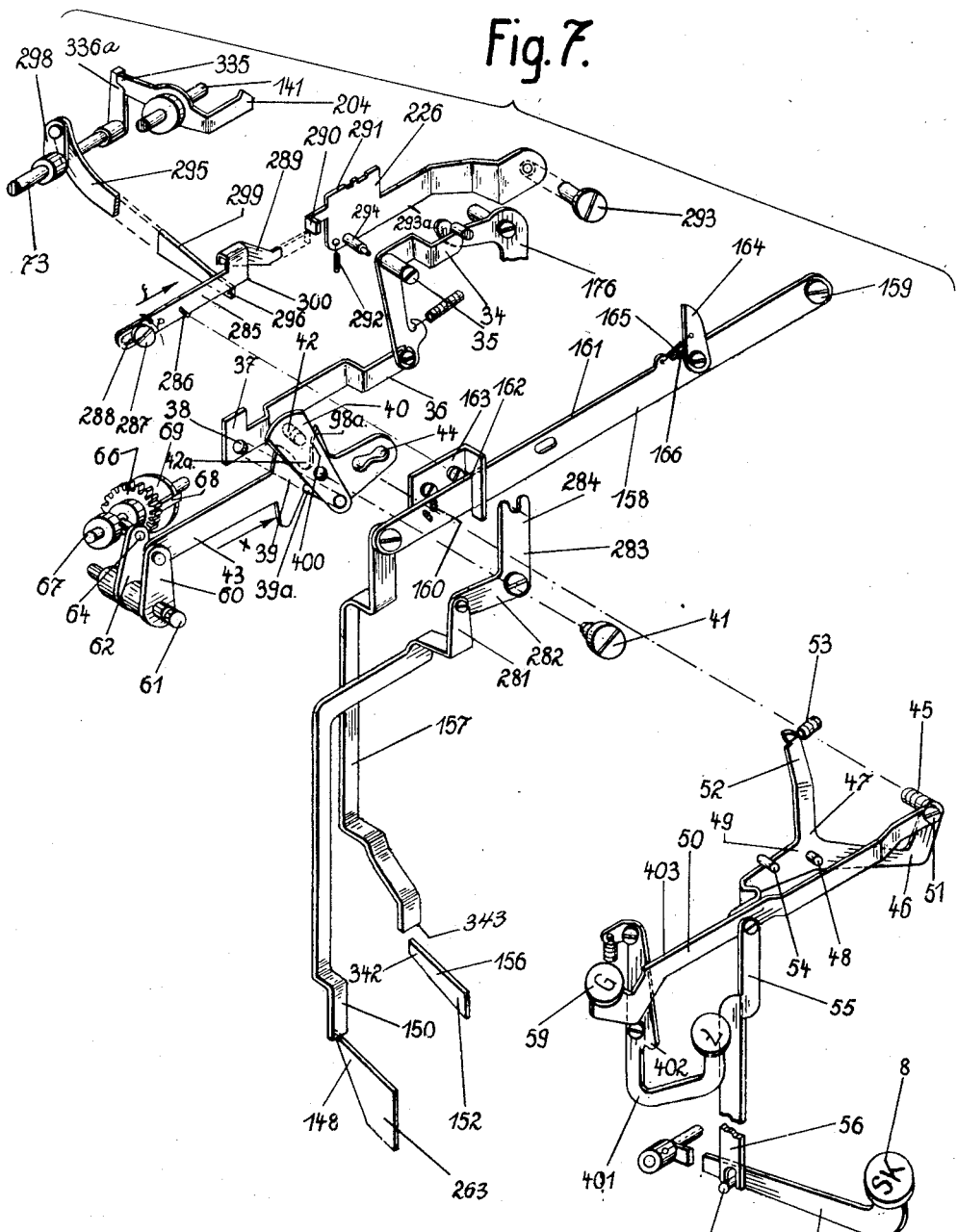

Month: January, 1937

| Date | Turnover | | Capital balance | | Interest Days | Interest numbers | |
| --- | --- | --- | --- | --- | --- | --- | --- |
| | Debit | Credit | in Debit | in Credit | | Debit | Credit |
| I   1 | 5100 | | | | | | |
| II | 345 | | | | | | |
| III | 55 | | 5500 | | 1 | 55 | |
| IV  2 | | 6738 | | 1238 | 2 | | 25 |
| V   4 | | 537 | | 1775 | 1 | | 18 |
| VI  5 | 15300 | | | | | | |
| VII | 45 | | 13570 | | 4 | 543 | |
| VIII 8 | | | | | | 598 | 43 |

Fig. 8   At 6% - Debit-Interests = 598 : 60 = RM 9,96
At 3% - Credit-Interests = 43 : 120 = RM 0,35

Month: January, 1937

| Date | Turnover | | Daily Interest numbers | | Text | Sum of day-interest numbers | |
| --- | --- | --- | --- | --- | --- | --- | --- |
| | Debit | Credit | Debit | Credit | | Debit | Credit |
| I   1 | 5100 | | | | | | |
| II | 345 | | | | | | |
| III | 55 | | 5500 | | | | |
| IV  2 | | 6738 | | 1238 | | | |
| V   3 | | | | 1238 | X | | |
| VI  4 | | 537 | | 1775 | | | |
| VII 5 | 15300 | | | | | | |
| VIII | 45 | | 13570 | | | | |
| IX  6 | | | 13570 | | | | |
| X   7 | | | 13570 | | | | |
| XI  8 | | | 13570 | | | | |
| XII | | | 13570 | | | 59780 | 4251 |
| | A | B | C | D | H | F | G |

Fig. 9   At 6% - Debit-Interests = 59780 : 6000 = RM 9,96
At 3% - Credit-Interests = 4251 : 12000 = RM 0,35

R. Anschütz & F. Schmidt
Inventors
By: Glascock Downing Seebold
Attys.

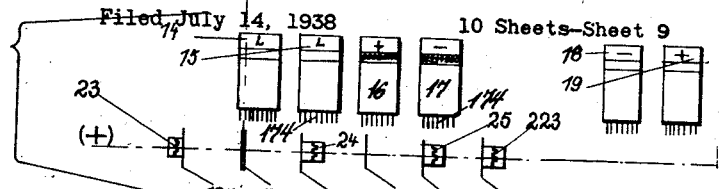
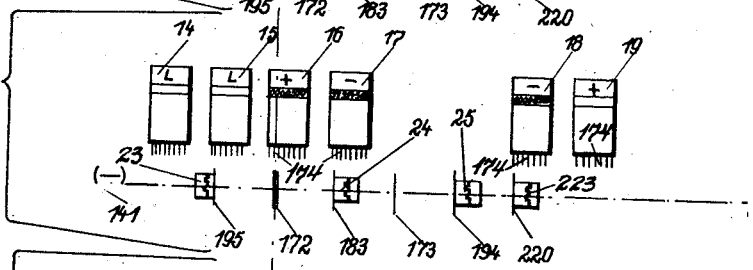
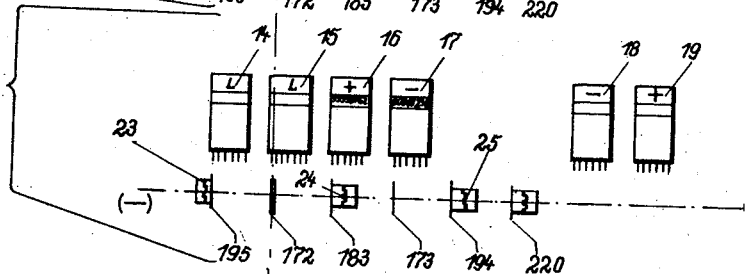
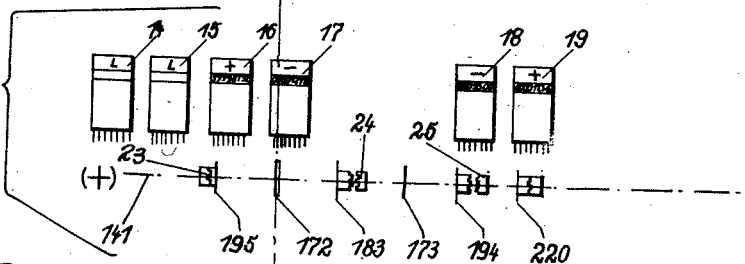
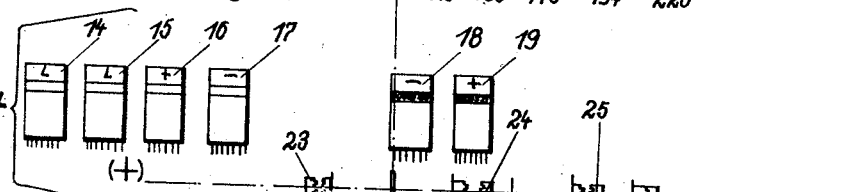
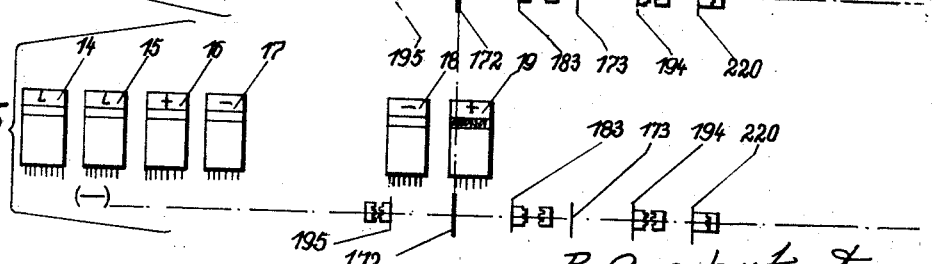

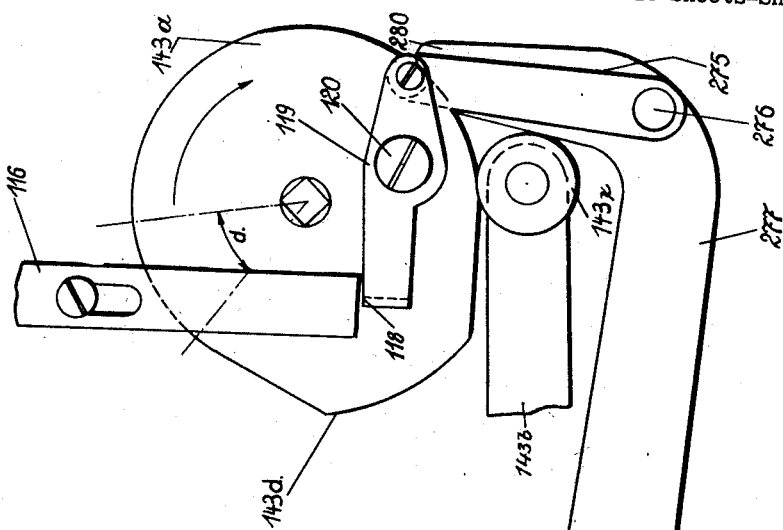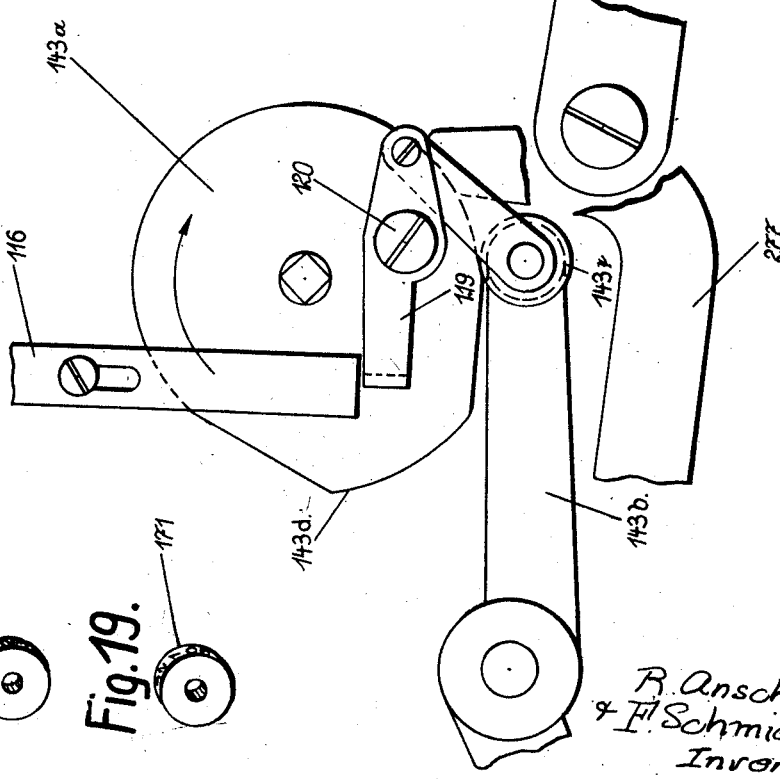

Patented Sept. 30, 1941

2,257,409

UNITED STATES PATENT OFFICE.

2,257,409

TYPEWRITING-CALCULATING MACHINE

Robert Anschütz and Fritz Schmidt, Zella-Mehlis, Thuringia, Germany, assignors to Mercedes Buromaschinen - Werke Aktiengesellschaft, Zella-Mehlis, Thuringia, Germany Application July 14, 1938, Serial No. 219,262
In Germany August 7, 1937

4 Claims. (Cl. 235—59)

This invention relates to a typewriting-calculating machine with total and subtotal taking control mechanism for the automatic taking of totals by decimal places. In the machine, extra total taking control means is employed besides the totalising member introducing the values.

Devices of this kind have already been proposed but had the drawbacks that their manipulation was difficult, that they were imperfect and that, therefore, they were not reliable in operation.

According to the invention it is rendered possible in a simple way to provide for subtotal taking by coupling the extra total taking control means as well as the totalising member to the calculating mechanism for total taking, and by uncoupling the extra total taking control means from the calculating mechanism after the taking of the total.

In the drawings, a constructional example of the device according to the invention is illustrated.

Fig. 5a is a detail.

Fig. 7 is a further perspective illustration, viewed from the front and the left.

Fig. 8 shows a portion of a form for calculating daily interest.

Fig. 9 shows the form as modified for operation in the machine according to the invention.

Figs. 10 to 15 show diagrammatically the position of the totalisers with respect to the columns of the form according to Fig. 9.

Figs. 16 and 17 show a detail of the control mechanism for the uncoupling of the total taking slide, Fig. 16 showing the construction as made heretofore, and Fig. 17 showing the construction according to the invention.

Fig. 18 shows a number roller for positive totalisers.

Fig. 19 shows a number roller for negative totalisers.

Figure 1:
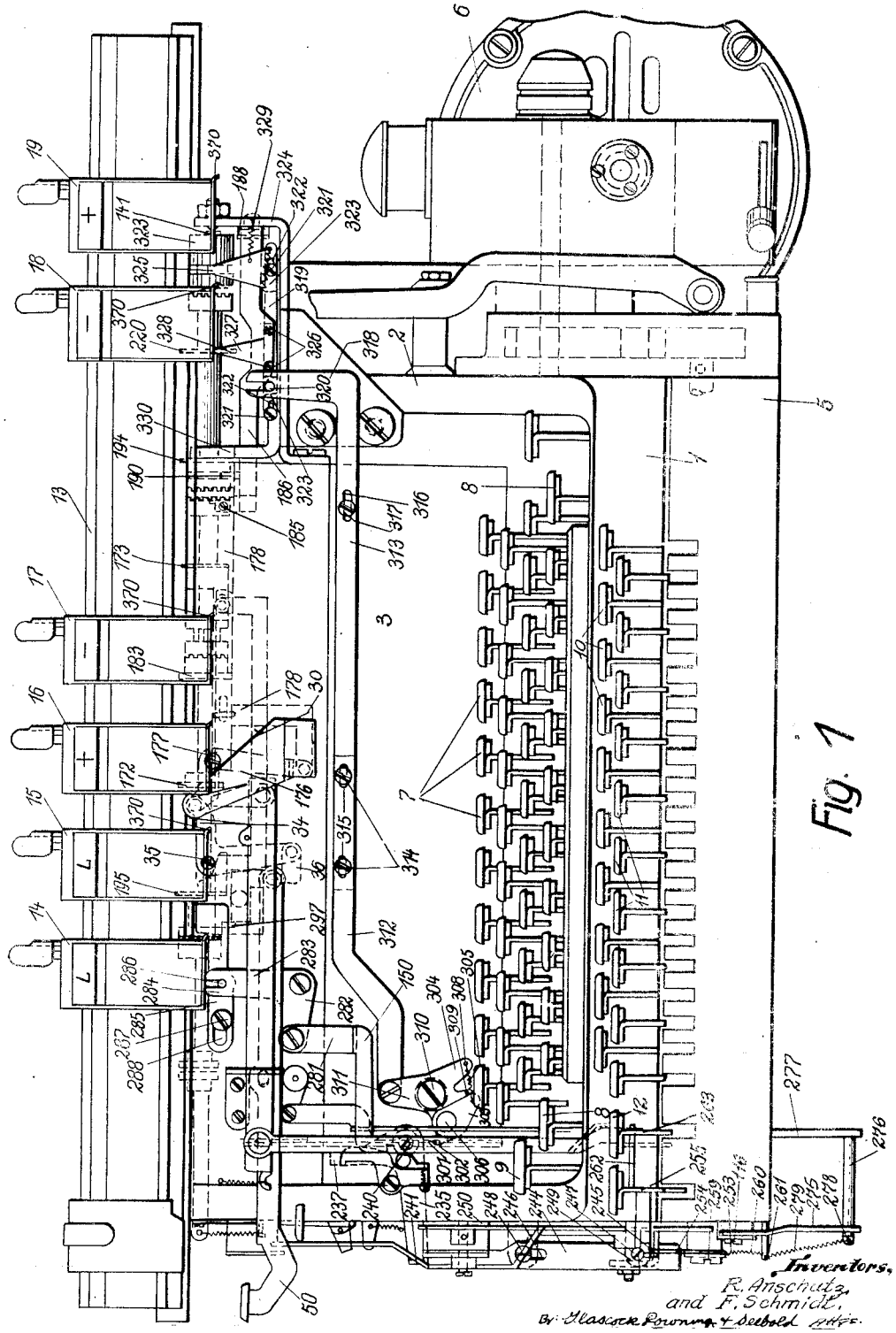
Fig. 1 is a front elevation of a typewriting-calculating machine according to the invention.

Before the construction of the device according to the invention will be detailed, it will first be explained for what work the device can be used, and as an example the calculation of daily interest will be described. As is known, daily interest is calculated by the formula $$\frac{\text{Capital} \times \text{rate of interest} \times \text{days}}{100 \times 360}$$

The above formula is subdivided into the interest number and the interest denominator. The interest number is calculated by the formula $$\frac{\text{Capital} \times \text{days}}{100}$$

and the interest denominator by the formula $$\frac{360}{\text{Rate of interest}}$$

If the interest number is divided by the interest denominator, the daily interest is obtained.

In Fig. 8 a normal interest calculation form is illustrated by way of example. Line III shows a capital balance in debit of RM 5500.00. As this capital has yielded interest for one day only, the interest number, according to the above formula, is $55 \times 1 = 55$. Line VII shows a capital balance in debit of RM 13,570.00. This capital has yielded interest for four days. The interest number, therefore, is $135.70 \times 4 =$ approx. 543. The total of the two interest numbers is 598. If the rate of interest is 6%, the interest denominator is 60, and the total of the debit interest is $598:60 =$ RM 9.96.

For the device according to the invention, the form is arranged as shown in Fig. 9. The amounts entered under "Capital balance" are designated "Daily interest numbers" in columns C and D. If a capital, for instance, "1238", or "13,570" column C and D, remains unaltered for some days, the product is obtained automatically by subtotal taking from a column totaliser, as will appear later, and while at the same time addition is performed in another column totaliser which receives the totals of all daily interest numbers. The interest number appears 100 times higher, for instance, instead of 598, Fig. 8, it is, more accurately, 59,780 in column F, Fig. 9. It is only necessary to divide by an interest denominator 100 times greater, to obtain the same amount, as before, i. e. RM 9.96.

*General description of the machine*

The device according to the invention is supposed to be fitted to a typewriting-calculating machine of the type known as the "Mercedes," with total taking control mechanism according to application Serial No. 146,897, filed June 7, 1937. This machine comprises a frame 1 (Figs. 1 to 3) enclosing the normal typewriting machine, a casing 3 for the calculating mechanism, the paper and totaliser carriage 4, and a bearing frame 5. A motor 6 is secured to the side wall 2 of the frame 1 for driving the machine. Among other parts, the typewriter keys 7, the shift keys 8, and the carriage return key 9 are arranged in the frame 1. The decimal tabulator keys 10, the calculating keys 11, and the total taking key 12 are arranged in the bearing frame 5.

The totalisers 14, 15, 16, 17, 18 and 19 are suspended from a totaliser suspension rail 13 secured to the front of the carriage 4. The totalisers 14 and 15, marked L, are dummies, they consequently do not contain a totalising mechanism, but are, like the normal totalisers 16 to 19 equipped with controlling plates 20, 21 and 22 (Fig. 2) which control the calculating mechanism. The controlling plates serve for unlocking the locking means for the calculating mechanism, for operating coupling sleeves 23, 24 and 25 (Figs. 3 and 6), and for selecting the species of calculation. All totalisers 14 to 19 are closed by front plates 26 (Fig. 2) whose lower ends 27 are bent forward at right angles and in the calculating position of the totalisers move along a roller 28 mounted to rotate on a bracket 30 extending from the front plate 29 of the casing 3 of the calculating mechanism. In this manner the totalisers 14 to 19 are held against lifting off in their calculating position.

Tabulator riders 33 are adjustably mounted on a tabulator rail 32 (Fig. 2) arranged along the plate 31 at the rear side of the carriage 4. Tabulator riders 33 are adjusted to conformity with the calculating positions of the totalisers 14 to 19, as defined by the columns A, B, C, D, H, F and G of the form in Fig. 9.

The controlling plate 22 by which the species is determined, acts on the horizontal arm of a controlling bellcrank 34 (Figs. 1, 3 and 7) in the calculating position of any dummy or active totaliser 14 to 19 to which the plate is secured. The bellcrank 34 is fulcrumed about a screw 35 at the front plate 29. Pivoted to the vertical arm of the bellcrank 34 is a connecting rod 36 the free end 37 of which engages a pin 39 with a hole 38. The pin 39 is arranged at the lower end of a rocking device 40 which is fulcrumed about a screw 41 at the inner side of the front plate 29. The rocking device 40 is equipped with another pin 42 at its upper end. The pins are arranged to alternately enter notches 39a and 42a in connecting rod 43, as the connecting rod is reversed by a pin 45 engaging in a slot 44. The pin 45 is riveted into an arm 46 of a three-armed lever 47 which is fulcrumed about a pin 48 at the inner side of the front plate 29. The arm 49 of the lever 47 is connected to the general change over key lever 50 which is mounted to swing about a screw 51 at the outer side of the front plate 29. A spring 53 attached to the arm 52 of the lever 47 pulls the lever and the general change over key lever 50 clockwise. This movement is limited by the upper edge of the arm 49 striking a fixed abutment 54.

A rod 55 is pivotally suspended on the general change over key lever 50 whose free forked end 56 embraces the shank of a rivet 58a on the left hand changing over key lever 58. By these means the carriage 4 is shifted upon depression of the general change over key 59. On the other hand, the general change over key lever 50 is not influenced when the shift key 8 is depressed.

Figure 5:
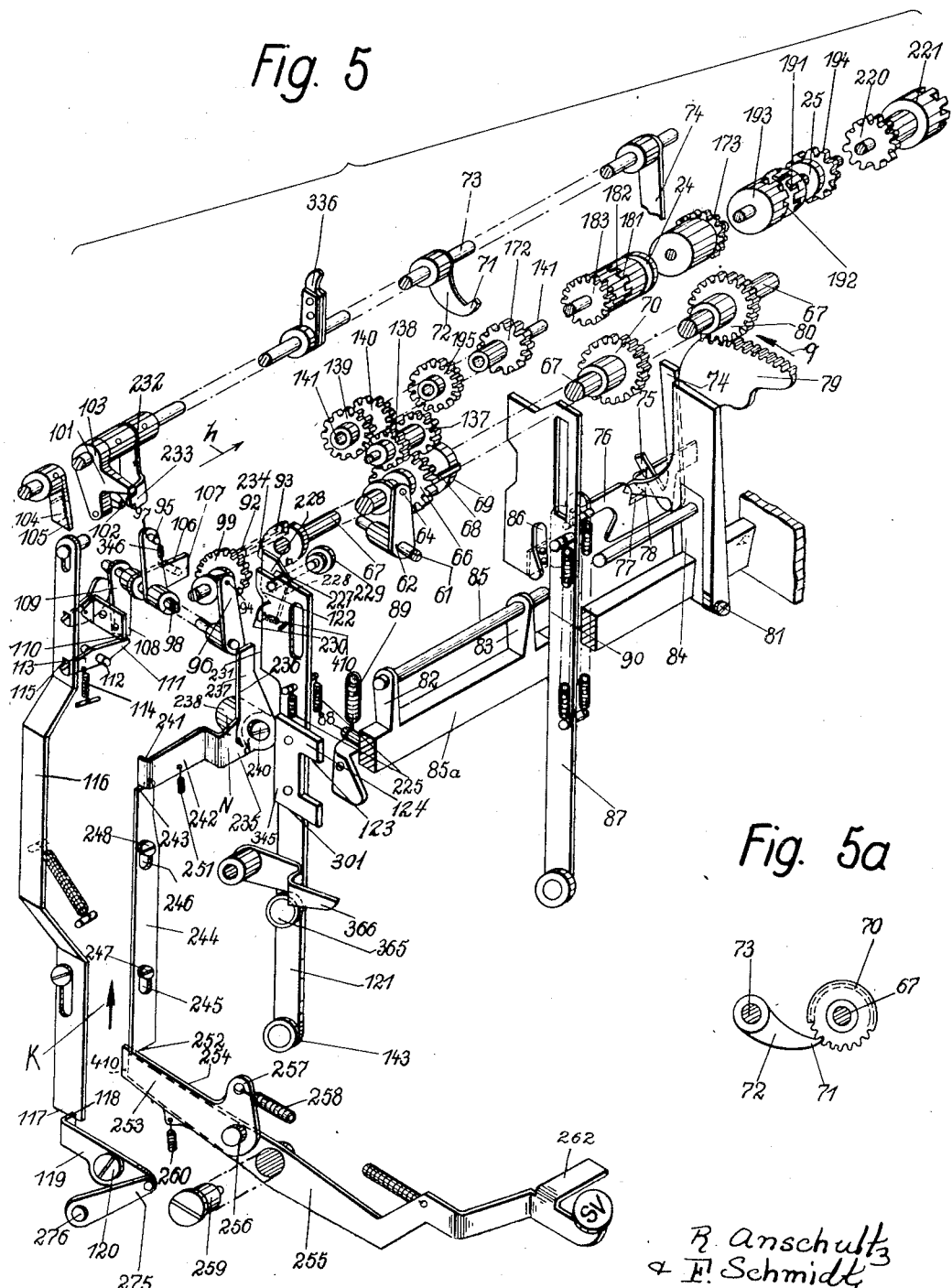
Fig. 5 is a perspective illustration of the calculating mechanism, viewed from the left.
Figure 6:
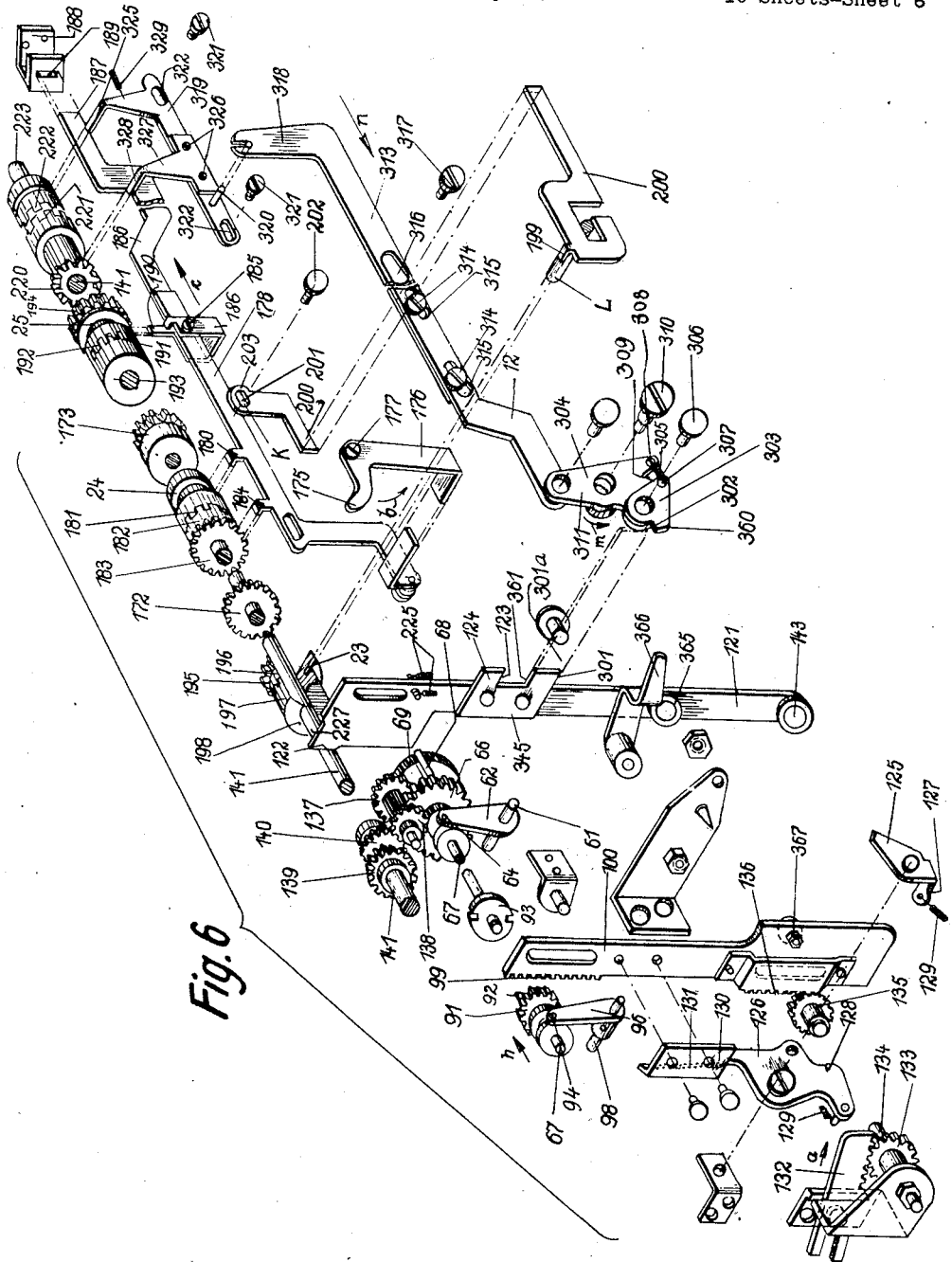
Fig. 6 shows further parts of the calculating mechanism in perspective view, viewed from the left.

In the initial position of the general change over key lever 50, the slide 43 which is controlled by the said lever through pin-and-slot connection 45, 44, is operatively connected to the pin 39 in its notch 39a. The slide 43 is pivotally connected to an arm 60 secured on a shaft 61 which is mounted in the casing 3 of the calculating mechanism (Figs. 5, 6 and 7). A coupling arm 62 also secured on the shaft 61 is equipped with a pin 64. This pin engages in a groove in a spur gear 66 which is mounted to slide axially on a shaft 67. Bars 68 on the spur gear 66 engage in corresponding notches in a disk 69 which is keyed on the shaft 67. A second spur gear 70 is secured on the shaft 67 (Figs. 5 and 5a) the teeth of which are engaged by a tooth 71 on a pawl 72 in the locking position of the calculating mechanism. The pawl 72 is keyed on a locking shaft 73 mounted in the casing 3 of the calculating mechanism.

An arm 74 secured on the locking shaft 73 (Fig. 5) has a hook 75 which is inclined to one side and engages in a slot in a slide 76. The slide has a recess 77 with which it engages an extension 78 of a totalising sector 79 which is arranged to be moved into mesh with a gear wheel 80 connected to the shaft 67. The sector 79 is the totalising member referred to in the introduction. In the initial position of the calculating mechanism the sector 79 is disengaged from the gear wheel 80. The sector 79 is fulcrumed on a swinging frame 85a by screws 81. The frame is mounted to swing in the casing 3 of the calculating mechanism. A round bar 85 is held by eyes 82, 83 and 84 to be acted on by the totalising cams 86 of the totalising slides released by the calculating key levers, for instance, the cam of the totalising slide 87. A spring 89 which is attached to a fixed part of the calculating mechanism casing 3 with its free end, is connected to a pin 88 on the swinging frame 85a and swings the swinging frame 85a and the sector 79 clockwise until the round bar 85 bears against the edge 90 of the totalising slide 87. The spring 89 is an energy accumulator for the sector, or totalising member 79.

Figure 4:
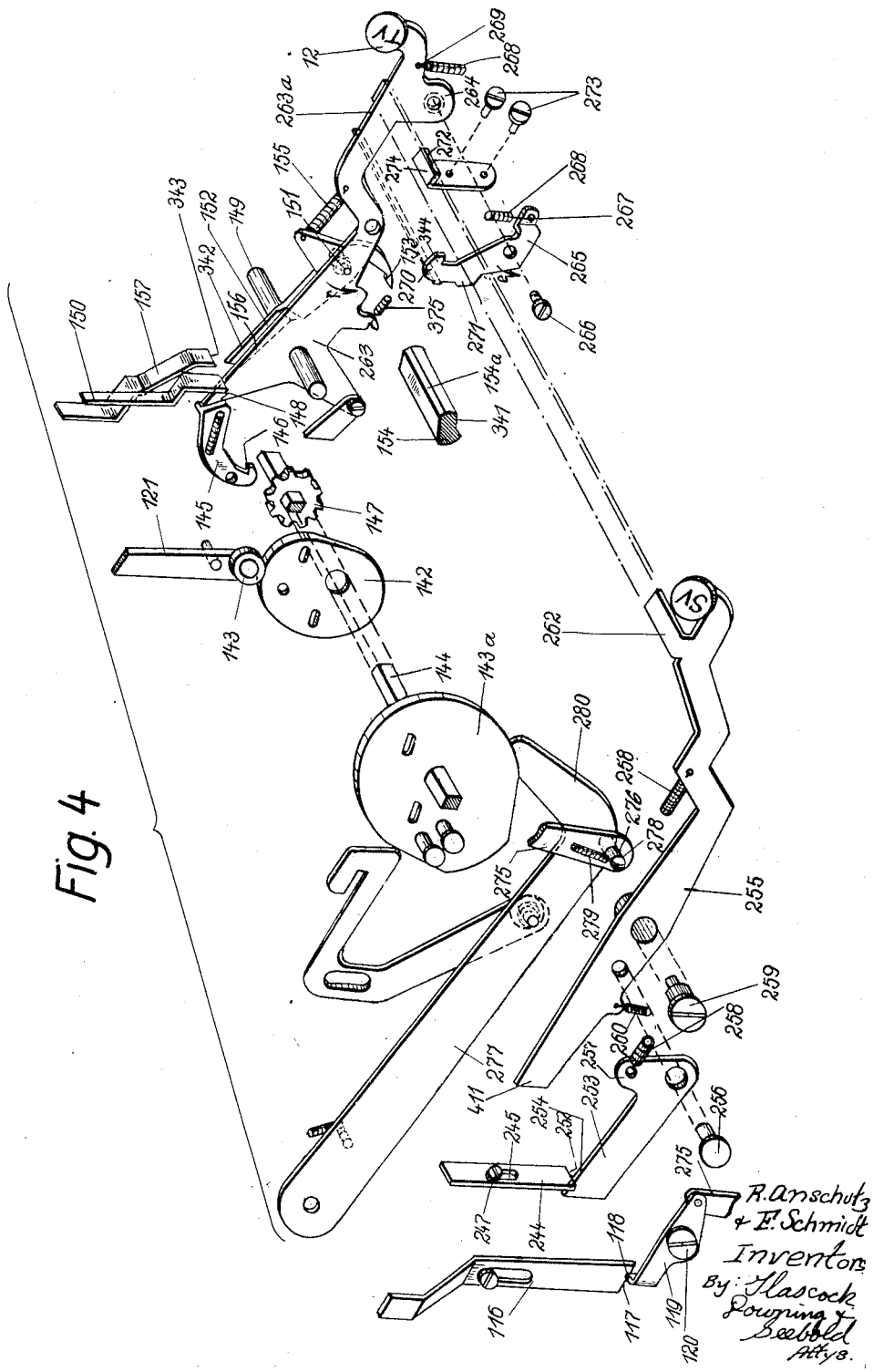
Fig. 4 is a perspective illustration of the total taking key levers, and of the parts operated by them, viewed from the left. The individual parts have been shown remote from each other in this and in some other figures, for the sake of clearness.

A spur gear 91 is mounted to slide axially on the shaft 67 for the purpose of total taking. Bars 92 on the spur gear 91 engage in notches in a disk 93 which is also secured on the shaft 67. The spur gear 91 is toothed and can be operatively connected to the teeth 99 on a zero setting slide 100 (Fig. 6) by pins 94 and 95 of the levers 96 and 97 which are keyed on a shaft 98. The operative connection is effected by a rib 101 (Fig. 5) of a guide 103 mounted to swing about the locking shaft 73. The rib engages a rectangular lug 104 of an arm 105 which is firmly connected to the locking shaft 73 on which it is seated. The lug 101 can, upon a swinging movement of the locking flap 102 in clockwise direction, act on the edge of a lever 107 rigidly connected to the shaft 98. Another arm 109 on the shaft 98, with a point 108 at its end, can act on the locking tooth 110 of a rocking device 111 which is mounted on a shaft 112. A spring 114 engaging the arm 113 of the rocking device tends to swing the device anti-clockwise. The arm 113 of the rocking device 111 projects through a slot 115 of a slide 116 which is mounted to move in vertical direction. With its lower edge 117 (Figs. 4 and 5)

the slide 116 engages the upper edge 118 of a lug on a rocking device 119 which is mounted to swing at the left hand outer side of the frame of the machine about a screw 120, and is operated in a manner to be described below.

An unlocking slide 121 (Figs. 5 and 6) which is movable vertically can act on the locking flap by its incline 122, and turn the flap, the lug 104, and the locking shaft 73, clockwise. The spur gear 91 is now moved into mesh with the teeth 99 (Fig. 6) of the zero setting slide 100 through parts 101, 107, 98, 96, 97, 94 and 95. The zero setting slide 100 and the unlocking slide 121 make up together the extra total taking means.

A U-shaped bracket 345 is secured to the unlocking slide 121 and the lower edge 123 of the upper bar 124 of the bracket can act on a catch 125 which is mounted to swing on a locking lever 126. A lug 127 on the catch is pulled against an edge 128 on the lever by a spring 129. When the catch 125 is turned clockwise, the locking lever partakes in this movement and a tooth 130 on the lever is disengaged from a rack 131 on the zero setting slide 100. This slide is now lowered under the action of a rack 132 extending to the typewriting mechanism—not shown—and moving in the direction of arrow $a$, through parts 133 to 136.

The descending zero setting slide rotates the main driving shaft 141 of the calculating mechanism through its teeth 99 meshing with the spur gear 91 on the shaft 67, and through a reversing mechanism 66, 137, 138, 139 and 140. The descent is released by a cam plate 142 (Fig. 4) whose perimeter is engaged by a roller 143 (Figs. 4, 5 and 6) at the lower end of the unlocking slide 121. The cam plate 142 is rigidly connected to a second cam plate 143a and both cam plates are mounted on a shaft 144. A coupling arm 145 which is mounted to slide on the cam plate 142, has a tooth 146 arranged to engage in spur gear 147 which is keyed on the shaft 144.

In the initial position of the machine, the tail end 148 of the total taking key lever 263 prevents the coupling arm from engaging with the spur gear 147 so that the cam plates 142 and 143a remain inactive. The total taking key lever 263 is mounted to swing about a bar 149. Its tail end 148 also acts on a rod 150 which, in a manner to be described below, effects the insertion of the zero setting stop serving for the total taking from the totalisers. A locking member 152 is fulcrumed on the total taking key lever 263 about a screw 151 and in the initial position of the total taking key lever a spring 155 holds a tooth 153 on the locking member against the slide 154a of a locking bar 154. The tail end 156 of the locking member 152 is placed at some clearance below a rod 157 suspended on an arm 158. The arm is mounted to swing about a screw 159 in the front wall of the casing 3 of the calculating mechanism. A spring 160 attached to the arm turns it clockwise until its edge 161 engages below an edge 162 of an angular guide 163. A pawl 164 is pivoted on the arm 158 which is held against a pin 166 secured on the arm 158 by a spring 165. The pawl 164 serves for unlocking the depressed total taking key lever 263.

*The drive of the totalisers 16 and 17*

At the center of the calculating mechanism, the known main driving gear wheel 172 (Fig. 6) is keyed on the main driving shaft 141 described in the preceding paragraph. At the left of the main driving wheel and pitched at a distance suitable for driving several totalisers at the same time, the coupling sleeve 23 and the spur gear 195 integral with the sleeve, is mounted to turn and to slide on the main driving shaft 141. In the initial position of the sleeve, crown teeth 196 on the sleeve engage crown teeth 197 of a driver 198 arranged firmly on the main driving shaft 141. At the right of the main driving wheel 172 and pitched at the same distance at the sleeve, another spur gear 183 is mounted to turn whose crown teeth 182 mesh with the teeth 181 of the coupling sleeve 24 mentioned in the preceding paragraph. A spur gear 173 is secured on the main driving shaft 141 at the same distance as before. At the side of this, the coupling sleeve 25, also mentioned above, with its spur gear 194 integral with the sleeve, is mounted on the main driving shaft. In the initial position of the sleeve, its crown teeth 191 mesh with the crown teeth 192 of a driver 193 firmly connected to the main driving shaft. In the uncoupled position of the spur gears 194 and 195, as will be described below, a stop tooth, now shown, issuing from the casing of the calculating mechanism, enters in a gap of each spur gear. The tooth holds that spur gear which is uncoupled at the time, in such position that when the carriage moves the driving members 174 (Fig. 2) of the totalisers move clear of the spur gears 194 and 195.

Figure 2:
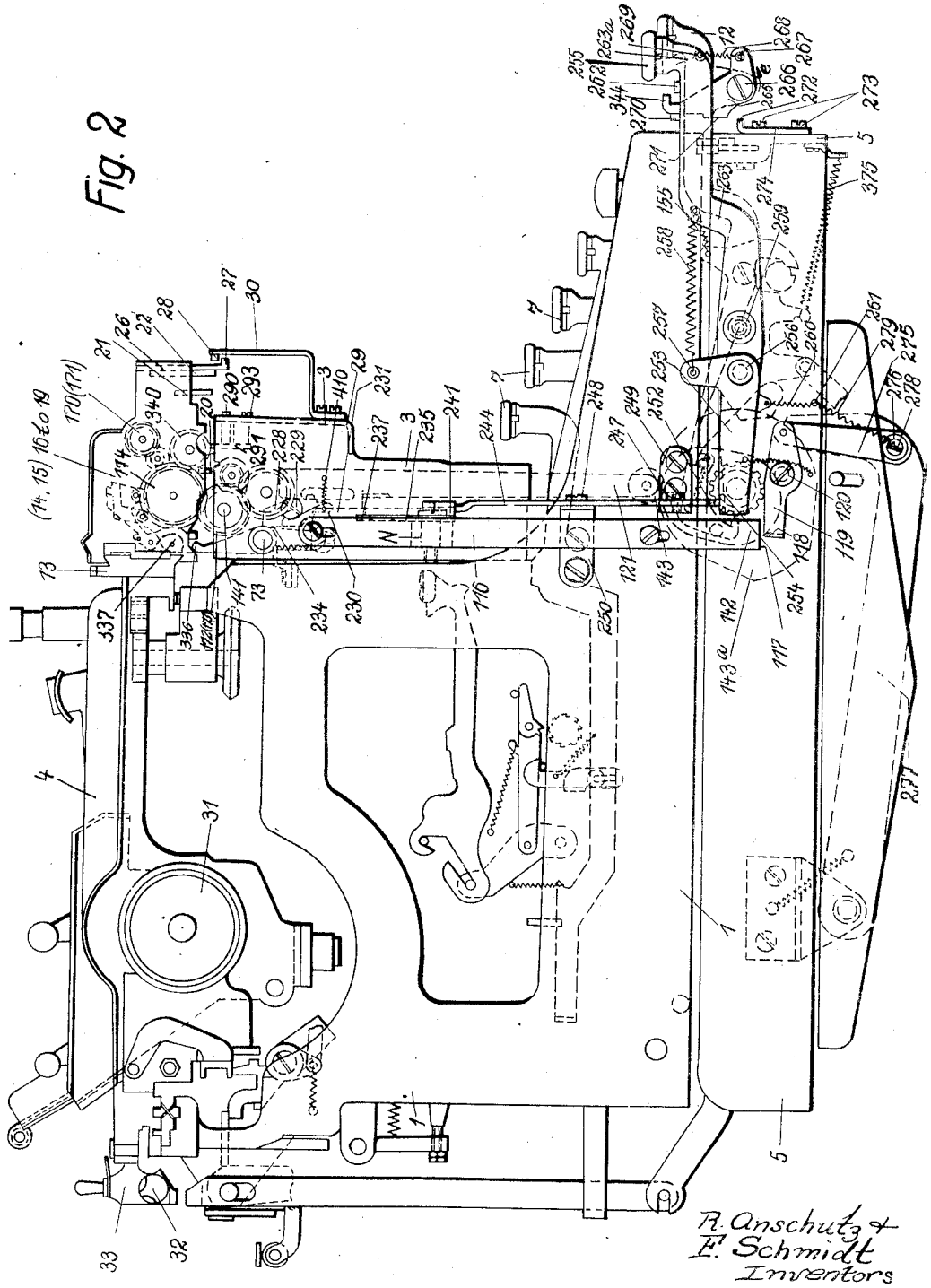
Fig. 2 is a side elevation of the machine, viewed from the left.
Figure 3:
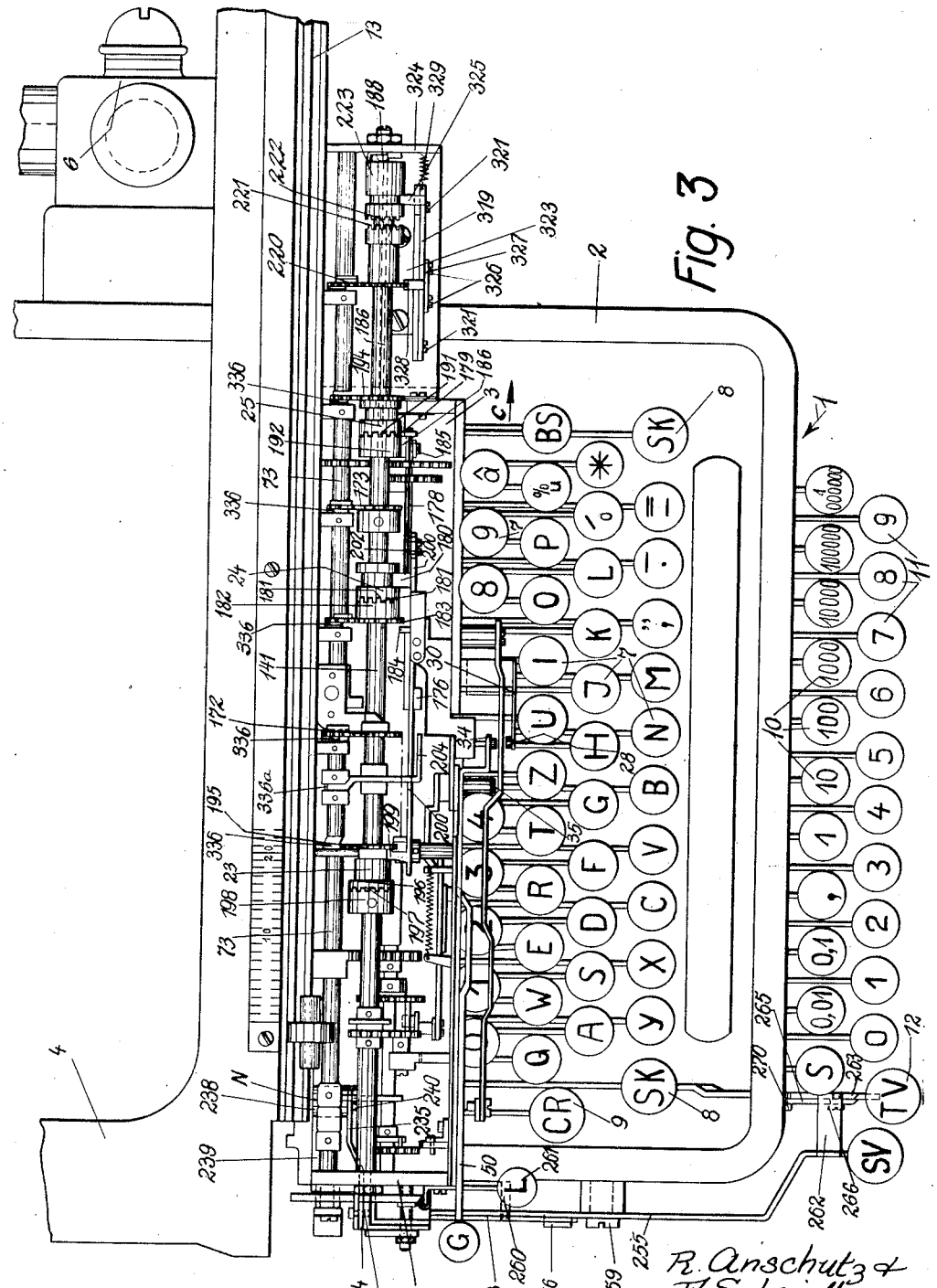
Fig. 3 is a plan view of the machine.

A spur gear 220 is mounted to turn but held against axial displacement on the main driving shaft 141 and crown teeth 221 on this spur gear can be moved into mesh with the crown teeth 222 of a coupling sleeve 223. At a distance equal to one pitch from each of the spur gears 172, 195, 183, 173, 194 and 220, unlocking pawls 336 (Figs. 3 and 5) is secured on the locking shaft 73. Figs. 2, 3 and 5). When the unlocking shaft is turned, the pawls act on the unlocking levers 337 (Fig. 2) of those places in the totalisers 16 to 19 which are in calculating position, and unlock them.

A controlling lever 176 is mounted to swing about a screw 177 (Fig. 6) in the front wall 29 of the casing 3. Pivotally connected to the controlling lever is a slide 178 whose free end is supported by an angular guide 179 (Fig. 3). An arm 180 extending at right angles from the slide 178 engages in the groove of the coupling sleeve 24. A tooth 184 at the left of the arm 180 can engage in one of the gaps of the spur gear 183 when the slide 178 has been moved in the direction of arrow $c$ and has disconnected the sleeve 24 and the spur gear 183. This prevents the spur gear 183 from shifting its position which might interfere with the coupling.

A lever 186 is secured to the right-hand position of the slide 178 by a screw 185. The free end of the lever is guided in a slot 189 of an angular guide 188 at the casing of the calculating mechanism, and an upwardly extending arm 190 on the bracket 186 engages in the groove of the sleeve 25.

A further member 200 engages the shank of a rivet 202 in the slide 178 by a slotted eye 201 in a vertical extension of the member. In the initial position of the member, the rounded end K of the eye bears against the shank of the rivet. The other, hook-shaped, end of the member 200 surrounds, and is guided by, a shaft L in the casing of the calculating mechanism, and a lug 199 on this end engages in the groove of the coupling sleeve 23. When a controlling plate 21 in one of the totalisers 14 to 19 swings the controlling lever 176, the coupling sleeves 24 and 25 can be shifted by the slide 178 separately or together with the coupling sleeve 23. The selective controlling of the coupling sleeves in two stages is effected by different confiuration of the controlling plates 21, and by providing the slotted eye 201 in the member 200.

The items to be written in the column C of the form in Fig. 9 are positive and must therefore be calculated in a totaliser having the positive number rollers 170 illustrated in Fig. 18. In conformity, the totaliser 16 is equipped with the number rollers 170 as a positive totaliser in the column D of the form are negatives, and the totaliser 17 is therefore equipped with the negative number rollers 171, Fig. 19, as a negative totaliser. As during one day debit and credit items are accounted and the absolute amount of the daily interest must appear either in the column C or the column D of the form, it is necessary that the two totalisers 16 and 17 should cooperate side by side as a complementary totaliser unit.

In the booking operation which will now be performed the value 5100 in column A, line I of the form, must first be calculated. To this end, the carriage is moved into its final position at the right, the line I of the form is placed in position ready for writing, and the 1000 key lever of the decimal tabulator 10 is depressed. The dummy 14 (Fig. 10) is now opposite the main driving wheel 172. At the same time the driving wheels 174 (Fig. 2) of totalisers 16 and 17 are operatively connected to the spur gears 173 (Figs. 6 and 10) and 194 with their 1000 places.

The dummy 14 is without the controlling plates 21 (Fig. 2) and 22. The coupling sleeves 23, Figs. 6 and 10, 24 and 25 therefore remain in their driving positions and the reversing mechanism 66, 137, 138, 139, 140 remains in its addition position 66, 137, 138, 139 corresponding to initial position. However, the control plate 20 (Fig. 2) acts on the lever 204 which holds the calculating mechanism locked (Figs. 3 and 7), swings the lever 204 and so releases the locking shaft 73 (Figs. 5 and 7) for unlocking.

When, corresponding to the 1000 place of the calculating mechanism, the calculating key 11 marked "5" is depressed, the value "5" is transmitted to the main driving shaft 141 by the corresponding cam plate element—not shown—which drives the totalising slide 87 (Fig. 5) and through parts 86, 85, 85a, 79, 80, 67, 66, 137, 138 and 139. The main driving wheel 172 and the spur gear 183 turn idle since the dummies 14 and 15 (Fig. 10) have no mechanism. However, the spur gear 173 drives the driving wheel 174 of the totaliser 16 in the 1000 place and the corresponding value 5 on the corresponding number roller appears in the window of the totaliser 16. At the same time, the driving wheel 174 of the 1000 place in the totaliser 17 is driven by the spur gear 194. Since the totaliser 17 is negative, it displays the complementary value 9999 5000 for the value 5 (000). After the value "5" has been introduced in the totalisers 16 and 17, it is written in line I, column A of the form. The carriage now moves from the 1000 place into the 100 place of the involved totalisers. The calculating key "1" is now depressed. When in this manner the value 5100 has been introduced in the totaliser 16, the totaliser 17 shows the complementary value of 9999 4900. Now, if required, text is written in column H, line I of the form. The carriage return key 9 is now depressed and the carriage is moved into its final position at the right, and at the same time the form is fed to the line II. The item 345 is calculated in the same way, the carriage return key 9 is depressed, the value "55" is booked in line III of the form. The totaliser 16 now contains the positive value 5500 and the totaliser 17 contains the complementary value 9999 4500.

The item 5500 is now to be taken automatically from the totaliser 16 and written in column C of the form but the value 5500 must be conserved in the totaliser 16. The following device is provided for this purpose.

*Preparation of total taking from totalizers 16 and 17*

In the above said "Mercedes" typewriting calculating machine with automatic total taking, the unlocking slide acts on the locking flap 102 with its incline 122 under the pull of its springs 225 (Fig. 5) after the total taking key 12 has been depressed, and the cam plate 142 has been set in motion by coupling it to the shaft 144. The locking flap 102 is turned clockwise and its guide body 103 engages the lever 105 and turns the locking shaft 73. The shaft, in a manner to be described below, effects the laying-in of the zero stop 226 (Fig. 7) for the totalisers, the unlocking of the calculating mechanism through the tooth 72 and the engagement of the totalising sector 79 with the spur gear 80 through parts 74, 75, 76 and 78.

During the descent of the unlocking slide which occurs herewith, the parts 132, 133, 135, 100 and 91 (Fig. 6) are also moved by a spring—not shown—engaging the part 132. The control of the movement occurs in consequence of the cooperation of the parts 367, 366 and 365, in dependence of the unlocking slide 121. During this movement the place of the totaliser to be cancelled, which is in calculating position, is set to zero by the zero setting slide 100 through the reversing mechanism and the driving wheel of the calculating mechanism allotted to this totaliser. The zero position is attained a short time before the unlocking slide 121 has attained its lowermost position. At the end of the descent, the upper edge 227 of the unlocking slide 121 releases the locking flap 102, so that the flap, locking shaft, and all parts connected to it, return into their initial positions. At the same time, the totalising sector 79 is moved out of mesh with the spur gear 80. This prevents the re-introduction of the same value into the cancelled place of the totaliser in consideration which would occur if it were omitted to swing the totalising sector laterally when it returns into its initial position.

With the subtotal taking from the totaliser 16, the daily interest number 5500 must be written in column C of the form, and must be withdrawn from the totaliser 16 without its being cancelled in this totaliser. To this end, return of the locking shaft 73 must be prevented when the unlocking slide 121 is in its lowermost position. For this purpose, a pawl or switch 228 (Figs. 2 and 5) is mounted to swing about a screw 229 at the upper end, and at the rear, of the unlocking slide 121. The pull of a spring 410 attached to the pawl holds the inner side of a rectangularly arranged lug 230 against the edge 231 of the unlocking slide 121. A lever 232 secured on the locking shaft 73 at the side of the locking flap 102 can act on the upper edge 234 of the pawl with its lug 233 and swing the pawl clockwise during the normal total taking operation so that in this case the locking flap can swing forward. On the other hand a bellcrank 235 can engage behind the lug 230 of the pawl 228 with the face 236 (Fig. 5) of its vertical arm 237 and hold the pawl against swinging. The bellcrank 235 is fulcrumed about a screw 240 in the rear wall of the casing 3 of the calculating mechanism, with the end 238 of its boss N bearing against the inner face 239 (Fig. 3) of the rear wall. The arm 242 of the bellcrank 235 which is crooked and turned over at right angles at its end 241, is turned in the direction of the arrow d (Fig. 5) by a spring 251 suspended on the arm at one end. The other end of the spring is held by a pin—not shown—in the machine frame 1.

The end 241 of the bellcrank 235 acts on the upper end edge 243 of a slide 244. The slide 244 has longitudinal slots 245 and 246 placed on the shanks of screws 247 and 248 and in its initial position is held on the shanks of the screws with the upper rounded ends of its longitudinal slots by spring 251. The screws 247 and 248 are held by angular brackets 249 and 250 (Figs. 1 and 2) arranged at the machine frame 1. The lower end 252 of the slide 244 is engaged under elastic pressure by the edge 254 of a lever 253. This lever is fulcrumed about a rivet 256 on the subtotal taking key lever 255. A spring 258 connected to the arm 257 of the lever 253 at one end is held by the subtotal taking key lever 255 at its other end. By these means an elastic buffer is provided by which the tail end 411 of the subtotal taking key lever 255 is connected to the slide 244.

The subtotal taking key lever 255 is fulcrumed about a screw 259 at the bearing frame 5 and is engaged by one end of a spring 260 whose other end engages a pin 261 (Figs. 1 and 2) at the bearing frame 5.

The lever, or manually operated member, 255, and the spring 260 make up an energy accumulator for the extra totalising means 121, 100.

The pull of the spring 260 turns the subtotal key lever 255 anti-clockwise until it is arrested by a chock—not shown—of its guide.

A bar 262 extending at right angles from the subtotal taking key lever 255 extends over the edge 263a of the total taking key lever 263. A hook 265 is fulcrumed on an eye 264 of the total taking key lever 263 by a screw 266 (Fig. 4). A spring 268 engaging an eye 267 of the hook is held by a bore 269 in the total taking key lever 263 and tends to turn the hook 265 in the direction of the arrow e. A lug 270 extending at right angles from the hook engages the edge 263a of the total taking key lever 263. An incline 271 of the hook 265 can be influenced by the edge 272 of an angular member 274 which is secured to the bearing frame 5 by screws 273, as will be described below.

A lever 275, Fig. 5, is pivotally connected to the rocking device 119. The lower end of the lever is fulcrumed about a pin 276. The pin, in turn, is secured on a lever 277 which is mounted to swing in the bearing frame 5 and forms part of the typewriting mechanism. This mechanism has only partly been shown and described. The lever 277 swings the typewriting frame and is mounted to swing in the bearing frame 5. An eye 278 is formed on the end of the pin 276 and a spring 279 secured to the eye, and to the above-mentioned pin 261 at its free end, places the end 280 of the lever against the cam plate 143a.

As briefly mentioned above, the total taking key lever 263 can act on a rod 150 by its tail end 148 (Fig. 4). The upper end 281 of the rod is pivoted to the horizontal arm 282 of a bellcrank which is fulcrumed on the front wall 29 of the casing of the calculating mechanism. With the vertical arm 283 forked at its end 284, the bellcrank engages a pin 286 secured to a slide 285. The slide 285 is mounted at the front wall 29 of the casing of the calculating mechanism, to swing about, and to slide on, a screw 287 whose shank it engages with a slotted eye 288. An incline 289 on the slide 285 is arranged to engage below a lug 290 of a flap 226 equipped with zero setting stop teeth 291. The flap is mounted to swing about a screw 293 at the front wall 29 of the casing of the calculating mechanism. A spring 292 pulls the flap anti-clockwise until its edge 293a engages a fixed pin 294 in the front wall 29 of the calculating mechanism. A push rod 295 is guided in a slot 297 (Fig. 1) with its front end 296 (Fig. 7). The slot is in the front wall 2a of the casing of the calculating mechanism, and the push rod is pivoted to an arm 298 secured on the locking shaft 73, and equipped with an incline 299 which can act on the lower edge 300 of the slide 285.

The unlocking slide 121 (Fig. 6) can engage, with the lower edge 301 of its U-bracket 124 the edge 302 of a pawl 303. The pawl is mounted to swing about a rivet 306 on a lever 304 and is influenced by a spring 305 whose ends are held by a bore 307 in the pawl and a bore 308 of the lever 304 which supports the pawl. Under the pull of the spring 305 the pawl 303 tends to engage a check 309 on the lever 304. The lever 304 is fulcrumed on a screw 310 secured in the front wall of the casing 3 of the calculating mechanism. The upwardly extending arm 311 of the lever 304 is pivotally connected to a rod 312. This rod is joined with a link 313 by screws 314. The holes for the admission of the screws 314 in the rod 312 are made as slots 315 so that a certain possibility of adjustment is provided for. The link 313 is guided by a screw 317 whose shank extends through the slot 316 in the link and which is secured to the casing of the calculating mechanism. The upwardly extending portion 318 of the link 313 engages a pin 320 on a slide 319 with its forked end. The slide 319 is guided on an angular bracket 323 (Figs. 1 and 3) by means of screws 321 whose shanks extend through its slots 322. The bracket 323 is secured to a part 324 which is secured to the right-hand side of the casing of the calculating mechanism by a flange and serves as a bearing for the main driving shaft 141.

The slide 319 has an arm 325 extending at right angles and engaging in the groove of a coupling sleeve 223. A T-shaped member 327 secured to the slide 319 by screws 326 has an arm 328 which in the initial position of the slide 319 engages in a gap of a spur gear 220. A spring 329 engages the slide 319 and its free end is held by a part 324 (Figs. 1 and 3). Under the pull of the spring 329, the slide 319 and the link 313 bear against the shanks of the screws 321 and 317 with the left-hand ends of their slots 322 and 316, defining the initial position of the said slide. An angular bracket 330 (Fig. 1) which is secured to the part 324, serves as a further bearing for the main driving shaft 141 and for guiding the lengthening lever 186 which belongs to the coupling system 178, 176.

*The subtotal taking from the totalisers 16 and 17 and the drive of the totalisers 18 and 19*

The value 5500 which is calculated in the totaliser 16 must now be withdrawn from this totaliser by subtotal taking and written down on line III, column C, of the form. Since this normally occurs in connection with the last item booked on a day, and consequently in the present instance after the value 55 has been accounted, the 1000 tabulator key lever of the decimal tabulator 10 which corresponds to the value 5500 (Fig. 3) is now depressed.

Hereby the totaliser 16 (Figs. 1 and 11) comes into driving connection, with the driving wheel 174 (Fig. 2) of its 1000 place, with the main driving wheel 172. At the same time, the totaliser 17, with its driving wheel 174 of the same place, comes into driving connection with the spur gear 183. Besides, the driving wheel 174 of the 1000 place of the totaliser 18 meshes with the spur gear 220. Since the value 5500 which is present in the totaliser 16 was introduced by addition, it must be withdrawn by subtraction. To this end, the totaliser 16 is equipped with a controlling plate 22 (Fig. 2) which now acts on the controlling lever 34 (Fig. 7) and reverses the known reversing mechanism which determines the species of calculation, to the driving connection 66, 140 (Fig. 6), by means of parts 36 (Fig. 7), 37, 38, 39, 40, 39a, 43, 60, 61, 62 and 64.

As the totaliser 16 has no controlling plate 21 (Fig. 2) for the uncoupling of the driving wheels, the coupling sleeves 23, 24 and 25 remain in their initial positions. Furthermore, the totaliser 16 acts on the lever 204 (Figs. 3 and 7) with its controlling plate 20 (Fig. 2). This lever which is mounted on the main driving shaft 141, is turned clockwise and its tooth 335 (Fig. 7) is moved out of active position with respect to the lever 336. The calculating mechanism is now free for unlocking from the locking shaft 73.

In order that the value 5500 which is withdrawn from the totaliser 16 through subtotal taking can be introduced into the totaliser 18 which is in calculating position with the spur gear 220 (Figs. 6 and 11) in positive form, this is equipped with number rollers 171.

The subtotal taking key lever 255 (Figs. 2, 3 and 4) is now depressed and its bar 262 (Fig. 4) drives the total taking key lever 263. Its tail end 148 now raises the rod 150 (Fig. 7) which turns the bellcrank 282, 283 clockwise. As the bellcrank engages the pin 286 with the forked end 284 of its arm 283, the pin and the slide 285 are shifted in the direction of the arrow f. During this movement the incline 289 engages below the lug 290 of the flap 226 and raises the flap in the direction of the arrow g until its zero setting stops 291 are arrested at a short distance from the path of the known zero setting teeth belonging to the zero setting wheels 340 (Fig. 2). At the same time the subtotal taking key lever 255 (Figs. 2 and 4) acts on the slide 244 with its lever 253 (Figs. 2, 4 and 5) and moves the slide in the direction of the arrow K. The slide, in turn, engages the bellcrank 235 with its upper edge 243 and turns the bellcrank clockwise so that its arm 237 moves into the path of the pawl 228 on the unlocking slide 121. The tail end 148 (Fig. 4) has now moved away from the coupling arm 145 and released the arm whereupon the tooth 146 on the arm engages in the spur gear 147 and couples the cam plates 142 and 143a with the driving shaft 144. The tooth 153 of the locking member 152 which is fulcrumed on the total taking key lever 263, now moves under the face 341 of the locking bar 154 under the action of the spring 155 so that the total taking key lever 263 is locked in its depressed position. In this position the edge 342 of the locking member 152 is below the lower end 343 of the rod 151.

While the total key lever 263 is moved downwards under the action of the bar 262 on the subtotal taking key lever 255 the hook 265 fulcrumed on the total taking key lever 263 strikes with its incline 271 the edge 272 of the angular member 274 (Fig. 2) and is turned against the spring 268 and the arrow e. A tooth 344 on the hook 265 engages the bar 262 of the subtotal taking key lever 255 and locks this in its active position while the total taking key lever 263 remains in locked position.

The cam plates 142 and 143a which are driven by the coupling operation described above, now rotate clockwise. The cam plate 142 releases the roller 143 of the unlocking slide 121 which now descends under the pull of its springs 225. The incline 122 of the unlocking slide 121 strikes the locking flap 102 (Fig. 5) and turns it clockwise. The rib 101 of the guiding body 103 supporting the locking flap bears against the edge 106 of the lever 107 and turns the lever clockwise, and with it the parts 98, 97, 96, 95 and 94. In this manner the spur gear 91 is shifted in the direction of the arrow h and meshes with the teeth 99 (Fig. 6) of the zero setting slide.

In the meantime, the lever 109 (Fig. 5) moves behind the tooth 110 of the rocking device 111 and is locked there. The guiding body 103 furthermore causes the lever 105 which is firmly connected to the locking shaft to partake in its movement, whereby the locking shaft 73 is also turned clockwise. The tooth 72 (Fig. 5a) releases the spur gear 70. The unlocking levers 336 unlock the 1000 places of the totalisers 16, 17, and 18 which are in calculating position, by means of the part 337 (Fig. 2), and the lever 74 (Fig. 5) moves the totaliser sector 79 into mesh with the spur gear 80 by means of parts 75, 76, 77 and 78. At the same time the push rod 295 (Fig. 7) is moved in forward direction and its incline 299 raises the slide 285 in the direction of the arrow g, so that the flap 226 with the zero setting stops 291 moves into the path of zero setting teeth—not shown—allotted to the zero setting wheels. Thereupon the unlocking slide 121 (Fig. 6) acts on the pawl 125 with edge 123 of its U-bracket 345, turns the pawl clockwise, turns the locking lever 126 in the same direction, moves the tooth 130 out of the teeth 131 of the zero setting slide 100 and so releases this slide.

At the same time, the edge 301 of the U-bracket bar 345 acts on the edge 302 (Fig. 6) of the pawl 303 and turns this, and the lever 304, in the direction of the arrow m. The parts 312, 313, 320 and 319 are shifted in the direction of the arrow n. The slide 319 withdraws its tooth 328 from the gap in the spur gear 220 and, through arm 325, moves the coupling sleeve 223 with its crown teeth 222 in engagement with the teeth 221 of the spur gear 220.

The zero setting slide 100 which has been released as described, is now lowered by the rack 132 which is urged in the direction of the arrow a by a spring, through parts 133, 134, 135 and 136. The spring for driving the slide 100 is more fully disclosed in my co-pending application Ser. No. 146,897, filed June 7, 1937, and designated by the numeral 479. The spur gear 91 (Figs. 5 and 6), and with it the shaft 67, are now rotated clockwise by the teeth 99 of the zero setting slide 100 meshing with the spur gear. This rotation is transmitted to the spur gear 140 by the spur gear 66 and to the main driving wheel 172 and the spur gear 220 through the main driving shaft 141. The main driving wheel 172 which meshes with the driving wheel 174 of the 1000 place of the totaliser 16, now rotates the wheel 174 until the above mentioned zero setting tooth of the corresponding zero setting wheel 340 (Fig. 2) engages the zero stop 291 (Figs. 2 and 7). While the 1000 place of the totaliser 16 is set to zero, the spur gear 80 (Fig. 5) is also rotated from the spur gear 91. As the spur gear 80 has been previously moved into mesh with the sector 79 the sector is now swung in the direction of the arrow *q* against the spring 89, for a corresponding number of pitches. The totaliser 16 now displays "0" in the 1000 place of its window while the 1000 place of the totaliser 17 is moved to "9" from "4."

While the value "5" is withdrawn from the 1000 place of the totaliser 16, it is introduced in positive form into the totaliser 18 by the spur gear 220 (Fig. 6) meshing with the driving wheel 174 (Fig. 2) of the same place in the totaliser 18. The number roller 171 of the 1000 place of the totaliser 18 now displays "5" in the window.

After the zero setting slide 100 (Fig. 6) has attained its lower final position, as determined by the zero setting tooth on the zero setting wheel 340 (Fig. 2) engaging the zero setting stop 291 (Figs. 2 and 7), the unlocking slide 121 still descends for some distance. The edge 301 of its U-bracket releases the pawl 303 which now enters the recess 361 of the bracket 345 with its part 360 under the pull of spring 329. In this manner the parts 304, 312, 313 and 319 are returned into their initial positions. The arm 325 of the slide 319 moves the coupling sleeve 223 to disengage its teeth 222 from the teeth 221 of the spur gear 220 while at the same time the tooth 328 of the slide again enters the gap of the said spur gear which is presented to it. Then the elevated portion 143d (Fig. 17) of the cam plate 143a (Fig. 4) acts on the end 280 of the lever 277 and turns it clockwise, whereby the value "5" is printed. The printing mechanism of the "Mercedes" is known, and will not be described here as it is no part of the invention.

During the rocking movement of the lever 277 the lever 275 which is connected to said lever 277 by the pin 276 and is pivotally connected to the rocking device 119 turns the rocking device clockwise around the screw 120. Hereby the edge 118 of the rocking device 119 acts on the slide 116 (Fig. 5) which is raised. The slide 116 turns the other rocking device 111 clockwise around the shaft 112. Consequently the tooth 110 of the rocking device 111 releases the lever 109. In the same moment the incline 122 of the unlocking slide 121 releases the locking flap 102 and a spring 346 which engages the lever 107, moves the spur gear 91 out of mesh with the zero setting slide 100 through parts 98, 96, 97, 94 and 95. Simultaneously the face 106 of the lever 107 acts on the projection 101 of the locking flap 102 and returns the locking flap 102 which is loosely arranged on the shaft 73 into its initial position. On the other hand, the lever 232 remains in the swung out position with the locking shaft 73, as in the lowest position, of the unlocking slide 121 the lug 233 of the lever 232 bears against the edge 234 (Figs. 2 and 5) of the pawl 228 which is now held against yielding by its lug 230 and the arm 237 of the bell-crank 235, as described in the paragraph "Preparation of the subtotal taking from the totalizers 16 and 17." Since the locking shaft 73 is held against rotation, the totalizing sector 79 is held in mesh with the spur gear 80 through the arm 74 secured on the locking shaft, and the slide 76 controlled by the arm 74.

As soon as the driving connection between the zero setting slide 100 (Fig. 6) and the spur gear 91 has been broken again, spring 89 swings the totalising sector 79 into its initial position against the direction of the arrow *q*, and the spur gear 80 is rotated in the opposite direction. This movement is transmitted to the main driving shaft 141 through the pair of gears 66 and 140, and the main driving shaft transmits it to the driving wheels 174 of the 1000 parts of the totaliser 16 and 17 through the main driving wheel 172 and the spur gear 183. The value 5 which has previously been written out, now appears on the corresponding number roller 170 of the totaliser 16. On the corresponding number roller 171 of the totaliser 17 the complementary value 4 is displayed in the window. However, the value 5 is not withdrawn from the totaliser 18 since, as mentioned above, the coupling 223 was uncoupled before the return of the totalising sector 79.

The elevated portion of the cam plate 142 now moves the unlocking slide 121 up again and the slide, through parts 365 (Fig. 6), 366 and 367 returns the zero setting slide into its initial position. Arrived in its topmost position, the unlocking slide 121, through the edge 122 which it has in common with the pawl 228, releases the lug 233 of the lever 232 which is firmly connected to the locking shaft, so that the lever can move forward again. The unlocking levers 336a now move into their initial positions, the lever 74 disengages the totalising sector 79 from the spur gear 80 over parts 75, 76, 77 and 78, and the point 71 of the lever 72 enters one of the gaps in the gear wheel 70, locking the calculating mechanism.

When these operations have been completed and the value 5 has been reintroduced into the totaliser 16, and the value 4 into the totaliser 17, the carriage moves for one step since it is released by the typewriting operation. In the operation of the "Mercedes" as designed heretofore, it has been found that when the carriage was fed through one step, the values had not yet been reintroduced into the totalisers. The cause is that the disengagement of the spur gear 91 from the teeth 99 of the zero setting slide 100 by the slide 116 occurs earlier than had been intended. Extra means might have been provided for arresting the carriage until the values had been reintroduced, but it was preferred not to derive the actuation of the slide 116 from the swinging frame 143b (Fig. 16), by which the carriage feed is operated, but from the swinging lever 277 which effects the typewriting operation. The end 280 of the lever 277 is engaged by the edge 143d of the cam plate 143a, which rotates in the direction of the arrow, much earlier than the roller 143x of the rocking frame 143b. The consequence is that the disengagement of the spur gear 91 and the zero setting slide 100 occurs earlier and the spring 89 which operates the totalising sector 79 can swing the sector back completely before the carriage feed commences. Therefore, the velocity of operation is not deteriorated by the subtotal taking operation.

In the other places of the totaliser 16, subtotal taking is effected in the same manner as explained above with reference to the 1000 place.

When the item 5500 has been withdrawn from the totaliser 16, written in column C, line III of the form in Fig. 9, and transferred to the totaliser 18, a dog 370 (Fig. 1) of the totaliser 16 engages the pawl 164 (Fig. 7). The pawl swings the arm 158 on which it is arranged, anticlockwise about the screws 159. This lowers the rod 157 whose lower edge 343 (Fig. 4) now engages the edge 342 of the locking member 152 and turns this in the direction of the arrow $r$ against the spring 155. This moves tooth 153 of the locking member 152 clear of the locking bar 154 and the total taking key lever 263 is returned into initial position by its spring 375. The subtotal taking key lever 255 is raised by the bar 262. This lever has been released by the tooth 344 of the hook 265 by the incline 271 of the hook 265 leaving the angular member 274, and is now returned into its initial position by the pull of its spring 260. The bellcrank 235 is rotated in the direction of the arrow $d$ by its spring 251 (Fig. 5) and returns into its initial position, as determined by the upper rounded edges of the slots 245 and 246 in the slide 244 engaging the shanks of the screws 247 and 248.

After the value 5500 has been transferred to the totaliser 18 the carriage is returned into its final position at the right by depression of the carriage return key 9, and at the same time a line is fed. The credit item 6738 on line IV in Fig. 9 must now be written and calculated in the totaliser 17.

For this purpose, the totalisers 14 to 17 are, with their 1000 places, moved into calculating position with respect to the spur gear 195 (Fig. 12), the main driving wheel 172, and the gear wheels 183 and 173 by corresponding operation of the decimal tabulator 10. The wheels 195 and 172 move idly as the dummies 14 and 15 are without mechanism. But the spur gears 183 and 173 mesh with the driving wheels 174 (Fig. 12) of the totalisers 16 and 17. As the totaliser 17 is negative and the credit item must appear in positive form in this totaliser, the reversing mechanism 66, 137, 138, 139 and 140 must be placed in subtraction position. This is effected by the controlling plate 22 in the dummy 15 acting on the controlling lever 34 (Fig. 7) and turns it clockwise. By means of the parts 36, 37, 38, 39, 40, 39a, 43, 60, 61, 62 and 64, this movement is transmitted to the spur gear 66 which is equipped with a coupling sleeve and now meshes with the spur gear 140 (Fig. 5). The dummy 15 is without the controlling plate 21 so that the coupling sleeves 23, 24 and 25 remain in their initial positions, as shown in Fig. 6. If the value 6738 is now introduced it is transferred in positive form to the number rollers of the totaliser 17 (Fig. 12), and in negative form to the number rollers of the totaliser 16, as described above. In this manner, the credit item 6738 is accounted with the total of all items of the first day, i. e. the debit item 5500. In the totaliser 17 appears the positive value 1238 and in the totaliser 16 appears the complementary value 9999 8762.

Since the value 1238 has been introduced in the totaliser 17 by subtraction, it must be withdrawn from the totaliser by addition. Therefore, the totaliser 17 is without a controlling plate 22 but it has a controlling plate 21 for uncoupling the sleeves 24 and 25. The totaliser 19 cooperating with the totaliser 17 has positive number rollers 170 as it is operatively connected to the calculating mechanism adjusted for addition in its calculating position, as described below, on account of the construction of the totaliser 17.

If subtotal taking is to be performed from the totaliser 17, the totaliser must be placed in active position with the main driving spur gear 172 with its 1000 place. In the manner which has been explained several times, the calculating mechanism is unlocked by the controlling plate 20 acting on the lever 204. As the totaliser 17 is without a controlling plate 22, the calculating mechanism remains in its addition position, as determined by the position of the wheels 66, 137, 138, and 139. With its control plate 21, the totaliser 17 turns the upper end 175 of the controlling lever 176 (Fig. 6) in the direction of the arrow $b$ and the slide 178 and its lengthening lever 186 are moved so far that the shank of the rivet 202 of the slide 178 moves into slight engagement with the rounded edge 203 of the slot 201 in the member 200. In consequence thereof, the spur gears 183 and 194 are disconnected from the main driving shaft 141 (Fig. 13) by shifting the coupling sleeves 24 and 25 while the spur gear 195 remains in its driving position. Thereby the totaliser 16 at the left of the totaliser 17 is in active engagement with the spur gear 195 with its 1000 place. This is necessary since this totaliser calculates the balance of the debit items.

When the totaliser 17 moves into calculating position to the main driving wheel 172, the totaliser 19 (Fig. 13) moves into active position to the spur gear 220 with its 1000 place. The totaliser 18 at the left of the totaliser 19 is not operated, as the corresponding spur gear 194 has previously been uncoupled.

The subtotal taking key lever 255 is now depressed and the value 1238 is withdrawn from the totaliser 17 in the manner described for the value 5500, transferred to the totaliser 19, and written on line IV, column D of the form in Fig. 9. In the totalisers 16 and 17, the values are conserved, since subtotal taking has been effected.

As there was no turnover on January 3, as shown on the form in Fig. 9, the subtotal 1238 is again withdrawn from the totaliser 17 so that now the value 2476 is in the totaliser 19.

In this manner the credit and debit items add in the totalisers 18 and 19. For instance, on January 8 the debit daily interest number 13570 appears in the totaliser 16, the credit daily interest number 1775 appears in the totaliser 17, the total 59780 of the debit daily interest numbers appears in the totaliser 18, and the total of the credit daily interest numbers 4251, appears in the totaliser 19.

*The total taking from the totalisers 18 and 19*

As explained in a preceding paragraph, in the present accounting example the interest numbers which have been found in the columns C or D of the form and added in the totaliser 18 or 19, are to be written on line XII in columns F and G of the form.

To this end, the 10,000 tabulator key of the decimal tabulator 10 corresponding to the highest place of the value 59,780 (Fig. 14) now calculated in the totaliser 18 is depressed. The totaliser 18, through its driving wheel 174 of the 10,000 place, comes into operative connection with the main driving wheel 172. The form, Fig. 9, comes into writing position with column F. When moving into the aforesaid position, the totaliser 18, by its controlling plate 20 again releases the locking of the calculating mechanism and, by its controlling plate 21, it operates the controlling lever 176 in such a manner that the coupling sleeves 24 (Fig. 14) 25, and 23 are uncoupled through parts 201, 202 203, 200 and 199. Furthermore, the controlling plate 22 on the totaliser 18 acts on the controlling lever 34 (Fig. 7) and the reversing mechanism 66 (Fig. 6), 137, 138, 139 and 140 is changed from its present addition adjustment into subtraction position, characterized by the connection 66, 140.

As the value 59,780 calculated in the totaliser 18 was introduced from the totaliser 16 into the totaliser 18 by subtraction during subtotal taking, the total is now taken by addition and therefore the general change over key lever must be depressed. The three-armed lever 47 (Fig. 7) is turned anti-clockwise and against the pull of the spring 53, whereby the slide 43, through pin-and-slot connection 45, 44, is turned anti-clockwise about its pivot on the lever 60. In this manner the pin 39 of the rocking device 40 moves out of the notch 39a of the slide 43 and the pin 42 of the rocking device moves into the notch 42a of the slide 43. The pin 42 engages the edge 400 of the notch in the slide and moves the slide in the direction of the arrow x. The lever 60 is hereby turned clockwise. The calculating mechanism now moves into addition position, as determined by the cooperation of parts 66, 137, 138 and 139. At the same time the rod 56 is lowered by the general change over key lever 50 and depresses the shift key lever 58 by means of the rivet 58a, and the platen is now shifted. In this position, italics are printed. When the general changing over key lever 50 has attained its lowermost position, the cancelling key lever 401 is jerked to the front and its step 402 engages over the edge 403 of the general changing over key lever. This lever is now locked in its depressed position. When the total taking key 12 (Fig. 4) is now depressed, the tooth 344 of the hook 265 which is pivoted thereon, moves past the lower edge of the bar 262 on the subtotal taking key lever 255, without influencing the bar. The total taking operation and the writing down of the value 59,780 now occurs in the same manner as in the "Mercedes" referred to above.

After the totaliser 18 has been clear written and the corresponding value has been entered in column F of the form in Fig. 9, the total taking key lever 263 is released as in the "Mercedes."

Thereupon, in conformity with the value calculated in the totaliser 19 (Fig. 15) which is 4251, the 1000 key lever of the decimal tabulator 10 is depressed. By these means, the totaliser 19, with the driving wheel 174 (Fig. 15), of its 1000 place, comes into operative connection with the main driving wheel 172 of the calculating mechanism 3. The totaliser 18 is in the region of the spur gear 194 but is not operated, as it has been uncoupled by the controlling plate 21 of the totaliser 19, like the spur gears 183 and 194. The totaliser 19 unlocks the locking of the calculating mechanism by the controlling plate 20 and has no controlling plate 22. But, as the general changing over key 59 (Fig. 7) is still depressed, the reversing mechanism which serves for the variation of the species, now assumes its subtraction position, as determined by the cooperation of parts 66, 137, 138 and 139. The total taking key 12 is now depressed whereupon the totaliser 19 is clearwritten in the manner known, and the value 4251 it contains, is written in column G of the form.

When the total taking key lever 263 has been returned into its initial position, the cancellation key lever 401 is depressed so that the general changing over key 59 can be returned into its initial position.

In the same manner the totalisers 16 and 17 are clearwritten, if necessary.

The subtotal taking device has here been described by way of example as employed for calculating interest numbers; this is neither its only, nor its most important, mode of application.

For instance, an important use is the transfer of numbers from the last line on one page of a sheet to the first line on the next page, for in this case the values must be conserved in the totalisers for further calculation. Obviously, the clutches on the shaft 141 are dispensed with, and only the main driving wheel 172 is required, as this is totalising work in the columns by themselves, and not accounting work of the several columns among each other.

In the elample illustrated, only a single totaliser 18 or 19 is arranged to be connected to the calculating mechanism in dependence from the unlocking slide 121 through parts 303, 304, 312, 313, 320 and 319. Obviously, two or more totalisers might be connected by the said parts.

We claim:

1. In a combined typewriter and calculating machine or the like, having a register, a manually operated lever for initiating subtotal taking operations, a zero setting slide member and an unlocking slide member, means controlled by said manually operated lever coacting with a numeral wheel of said register for limiting the movement of said zero setting slide member, a driving shaft, means adapted to be coupled with said driving shaft under control of said manually operated lever, means for driving said zero setting slide to effect subtotal taking operations, a main calculating shaft, a connecting shaft, a reversible gearing intermediate said main calculating shaft and said connecting shaft, coupling means including a coupling wheel slidable on said connecting shaft and adapted to be engaged with said zero setting slide member to drive said main calculating shaft, a rockable actuating segment movable into operative driving relation to the connecting shaft, and an energy accumulator for driving said segment, in combination, means operated by said unlocking slide member to control the driving relation between said rockable actuating segment and said connecting shaft, a member for initiating typing operations under control of said drive shaft coupled means, members driven by said initiating member for effecting disengagement of said coupling wheel from said zero slide member and thereby interrupt the driving connection between said main calculating shaft and said zero setting slide driving means, means controlled by said manually operated lever for maintaining the operative driving relation between said actuating segment and said main calculating shaft.

2. In a combined typewriter and calculating machine or the like, a manually operated lever for initiating subtotal taking operations, a zero setting slide member and an unlocking slide member, a main calculating shaft, a connecting shaft, a rockable actuating segment movable into operative driving relation to the connecting shaft, and an energy accumulator for driving said segment, in combination, means operated by said unlocking slide member to establish operative driving relation between said segment and said connecting shaft, means on said unlocking slide member coacting with the drive establishing means under control of the manually operated lever for maintaining the driving relation between the segment and said main calculating shaft.

3. In a combined typewriter and calculating machine or the like, a manually operated lever for initiating subtotal taking operations, a zero setting slide member and an unlocking slide member, means adapted to be coupled with said driving shaft, a main calculating shaft, a connecting shaft, coupling means adapted to be engaged with said zero setting slide member, a rockable actuating segment, and an energy accumulator for driving said segment, in combination, means operated by said unlocking slide member to establish operative driving relation between said segment and said connecting shaft, a member for initiating typing operations under control of said drive shaft coupled means, members driven by said initiating member for effecting disengagement of said coupling means from the zero setting slide member, means on said unlocking slide member coacting with said drive establishing means under control of said manually operated lever for maintaining the driving relation between said actuating segment and the main calculating shaft, a locking member operative under control of said manually operated lever and swingable into the path of said maintaining means to lock the latter and the drive establishing means in the operative position for maintaining said actuating segment in operative driving relation to the main calculating shaft.

4. In a combined typewriter and calculating machine or the like, column totalizers, a manually operated lever for initiating total taking and subtotal taking operations, a zero setting slide member and an unlocking slide member, a main calculating shaft, a connecting shaft, a reversible gearing intermediate said main calculating shaft and said connecting shaft, a rockable actuating segment movable into operative driving relation to the connecting shaft, and an energy accumulator for driving said segment, in combination, means operated by said unlocking slide member to control the engagement of said rockable actuating segment and said connecting shaft, means for maintaining said engagement during displacement of the unlocking slide, a coupling member on the main calculating shaft, and means intermediate the main calculating shaft and the unlocking slide to establish operative driving relation between said coupling member and said main calculating shaft, said intermediate means controlled by the unlocking slide in one direction of its motion for effecting driving of at least one of said column totalizers.

ROBERT ANSCHÜTZ.
FRITZ SCHMIDT.